US012747677B2

(12) United States Patent
Gravina

(10) Patent No.: US 12,747,677 B2
(45) Date of Patent: Sep. 29, 2026

(54) INTEGRATED IN-LINE EMERGENCY LUBE PUMP ASSEMBLY FOR PLANETARY GEARBOX CONFIGURATIONS

(71) Applicant: GE Avio S.r.l., Rivalta di Torino (IT)

(72) Inventor: Michele Gravina, Milan (IT)

(73) Assignee: GE AVIO S.R.L., Rivalta di Tornino (IT)

( * ) Notice: Subject to any disclaimer, the term of this patent is extended or adjusted under 35 U.S.C. 154(b) by 0 days.

(21) Appl. No.: 19/192,792

(22) Filed: Apr. 29, 2025

(65) Prior Publication Data

US 2025/0361821 A1 Nov. 27, 2025

(30) Foreign Application Priority Data

May 22, 2024 (IT) ........................ 102024000011536

(51) Int. Cl.
*F01D 25/20* (2006.01)
*F16H 57/04* (2010.01)

(52) U.S. Cl.
CPC ......... *F01D 25/20* (2013.01); *F16H 57/0435* (2013.01); *F16H 57/0436* (2013.01); *F16H 57/0441* (2013.01); *F16H 57/0442* (2013.01); *F16H 57/045* (2013.01);
(Continued)

(58) Field of Classification Search
CPC .......... F01D 15/12; F01D 21/14; F01D 25/18; F01D 25/20; F05D 2260/98; F05D 2260/40311; F02C 7/06; F02C 7/36; F16H 57/0435; F16H 57/0436; F16H 57/0441;
(Continued)

(56) References Cited

U.S. PATENT DOCUMENTS 8,230,974 B2 7/2012 Parnin
8,307,626 B2 11/2012 Sheridan
(Continued)

FOREIGN PATENT DOCUMENTS

DE 102014205584 A1 10/2014
FR 3075875 A1 6/2019

OTHER PUBLICATIONS

Italy Patent Office Search Report for Application No. 102024000011536 dated Dec. 18, 2024 (11 pages with English Translation).

*Primary Examiner* — Sang K Kim
(74) *Attorney, Agent, or Firm* — Venable LLP; Michele V. Frank

(57) ABSTRACT

Disclosed herein is an integrated in-line emergency lube pump assembly for a planetary gearbox, including a main lube pump, a coaxial lube pump coaxially aligned with and coupled to the planetary gearbox, and an oil tank having a main section and an auxiliary section. There is no physical boundary between the main section and the auxiliary section of the oil tank. When the detected pressure in the oil supply line is equal to or exceeds a predetermined pressure threshold, the main lube pump operates to causes the main pump to pump oil from the main section of the oil tank to the planetary gearbox. Alternatively, when the detected pressure in the oil supply line is less than the predetermined pressure threshold the main lube pump ceases operation to cause the coaxial lube pump to draw oil from the auxiliary section of the oil tank to the planetary gearbox.

20 Claims, 4 Drawing Sheets

(52) U.S. Cl.
CPC .................... *F16H 57/0486* (2013.01); *F05D 2260/40311* (2013.01); *F05D 2260/98* (2013.01)

(58) Field of Classification Search
CPC ............... F16H 57/0442; F16H 57/045; F16H 57/0479; F16H 57/0486
See application file for complete search history.

(56) References Cited

U.S. PATENT DOCUMENTS

| | | | | |
|---|---|---|---|---|
| 8,985,278 | B2 * | 3/2015 | Xu | F01D 25/20 184/6.11 |
| 9,410,448 | B2 | 8/2016 | Sheridan et al. | |
| 9,909,453 | B2 | 3/2018 | Fang et al. | |
| 10,107,142 | B2 | 10/2018 | Mastro et al. | |
| 10,107,157 | B2 | 10/2018 | Roberge | |
| 10,494,951 | B2 | 12/2019 | James et al. | |
| 10,823,006 | B2 * | 11/2020 | Leque | F02K 3/06 |
| 11,125,111 | B2 | 9/2021 | Mason et al. | |
| 11,131,214 | B2 | 9/2021 | Menczykalski et al. | |
| 11,203,974 | B2 | 12/2021 | Sheridan | |
| 11,215,078 | B2 * | 1/2022 | Menczykalski | F01D 25/20 |
| 12,228,042 | B1 * | 2/2025 | Miller | F02C 7/06 |
| 12,253,000 | B2 * | 3/2025 | Williams | F02C 7/36 |
| 12,258,904 | B2 * | 3/2025 | Turnquist | F02C 7/06 |
| 12,510,002 | B2 * | 12/2025 | Sibbach | F01D 25/20 |
| 12,601,281 | B2 * | 4/2026 | Miller | F01D 25/18 |
| 2019/0316672 | A1 * | 10/2019 | Davies | F16H 57/0479 |
| 2019/0323597 | A1 * | 10/2019 | Sheridan | F16H 57/0482 |
| 2020/0182151 | A1 * | 6/2020 | Hill | F02C 7/06 |

* cited by examiner

INTEGRATED IN-LINE EMERGENCY LUBE PUMP ASSEMBLY FOR PLANETARY GEARBOX CONFIGURATIONS

CROSS REFERENCE TO RELATED APPLICATION

The present application claims the priority benefit of Italy Patent Application No. 102024000011536 entitled "Integrated In-Line Emergency Lube Pump Assembly for Planetary Gearbox Configurations" and filed May 22, 2024, the entire contents of which is hereby incorporated by reference herein.

TECHNICAL FIELD

The present specification generally relates to turbine engines and, more specifically, to an integrated in-line lube pump assembly for lubricating a planetary gearbox assembly of a turbine engine during an emergency situation.

BACKGROUND

Planetary gearboxes are commonly used in a wide range of machinery, such as turbine engines, and offer advantages in terms of torque transmission and compactness. However, it is often difficult to ensure continuous and effective lubrication of the various gears and bearings of traditional planetary gearboxes. Lubrication aids in maintaining operational efficiency of the planetary gearbox during an emergency situation, for example, when there is a loss in pressure of the oil supply line to the planetary gearbox. In particular, traditional emergency lube systems are known to use star gearboxes including a lube pump assembly driven by the fan shaft in an offset configuration. Accordingly, a need exists for a lubrication system that provides a reliable lubricant source for a planetary gearbox during an emergency situation.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
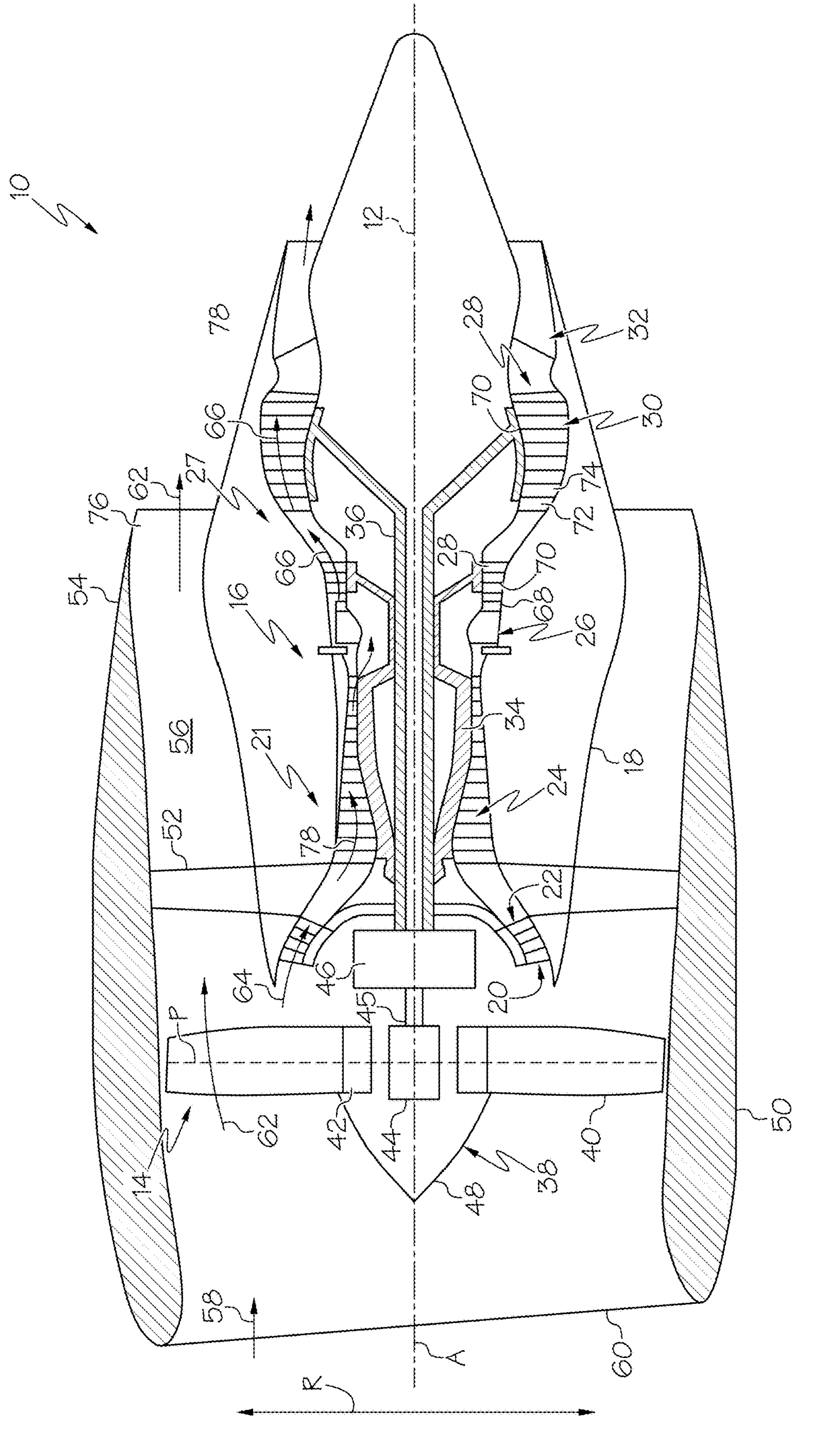
FIG. 1 schematically depicts a cross-sectional side view of a turbine engine, taken along a centerline axis of the turbine engine, according to an embodiment of the present disclosure.

Embodiments described herein are directed to turbine engines, integrated in-line lube pump assemblies for a planetary gearbox, and methods of supplying lubrication to a planetary gearbox of a turbine engine during an emergency situation. The in-line lube pump assembly includes a main lube pump, a coaxial lube pump that is coaxially engaged with the planetary gearbox, an oil tank having a main section and an auxiliary section, an oil supply line in which the main lube pump draws oil from the main section of the oil tank to the planetary gearbox, a main scavenge line in which the main lube pump draws oil from a sump in the planetary gearbox to the main section of the oil tank, an auxiliary scavenge line in which oil flows from the sump in the planetary gearbox to the auxiliary section of the oil tank, and an auxiliary feeding line in which the coaxial lube pump draws oil from the auxiliary tank to the planetary gearbox. During normal operating conditions, when normal pressure is detected in the oil supply line, both the main lube pump and the coaxial lube pump operate. During emergency operating conditions, such as when a pressure below a predetermined pressure threshold is detected in the oil supply line, the main lube pump ceases operation and the coaxial lube pump draws oil from the auxiliary section of the oil tank through the auxiliary feeding line.

As described herein, conventional lubrication systems, particularly those used in connection with planetary gear assemblies, often struggle to provide consistent lubrication to the planetary gear assembly in situations where there is a drop in pressure in the oil supply line. Furthermore, in the event of a failure, i.e., low pressure, traditional lubrication systems are incapable of supplying a consistent supply of emergency lubrication to the planetary gear assembly which can lead to failure of the entire turbine engine.

The disclosed integrated in-line lubrication pump assemblies aim to address the shortcomings of traditional lubrication systems for planetary gear assemblies by providing a supply of lubrication to the planetary gear assemblies during emergency situations, which occurs when a low pressure is detected in the oil supply line to the planetary gear assembly. Various embodiments of turbine engines, integrated in-line lube pump assemblies for a planetary gear assembly, and methods of supplying lubrication to a planetary gear assembly of a turbine engine during an emergency situation are described in more detail herein. Whenever possible, the same reference numerals will be used throughout the drawings to refer to the same or like parts.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," and "second" may be used interchangeably to distinguish one component from another and are not intended to signify location or importance of the individual components.

The terms "forward" and "aft" refer to relative positions within a gas turbine engine or vehicle, and refer to the normal operational attitude of the turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 is a schematic cross-sectional diagram of a turbine engine 10, taken along a centerline axis 12 of the turbine engine 10, according to an embodiment of the present disclosure. As shown in FIG. 1, the turbine engine 10 defines an axial direction A (extending parallel to a longitudinal, centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the centerline axis 12 via a fan shaft 45 that is powered by the LP shaft 36 across a power planetary gearbox, also referred to as a planetary gearbox 46. The planetary gearbox 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 acrodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased as the second portion of air 64 routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the planetary gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 2:
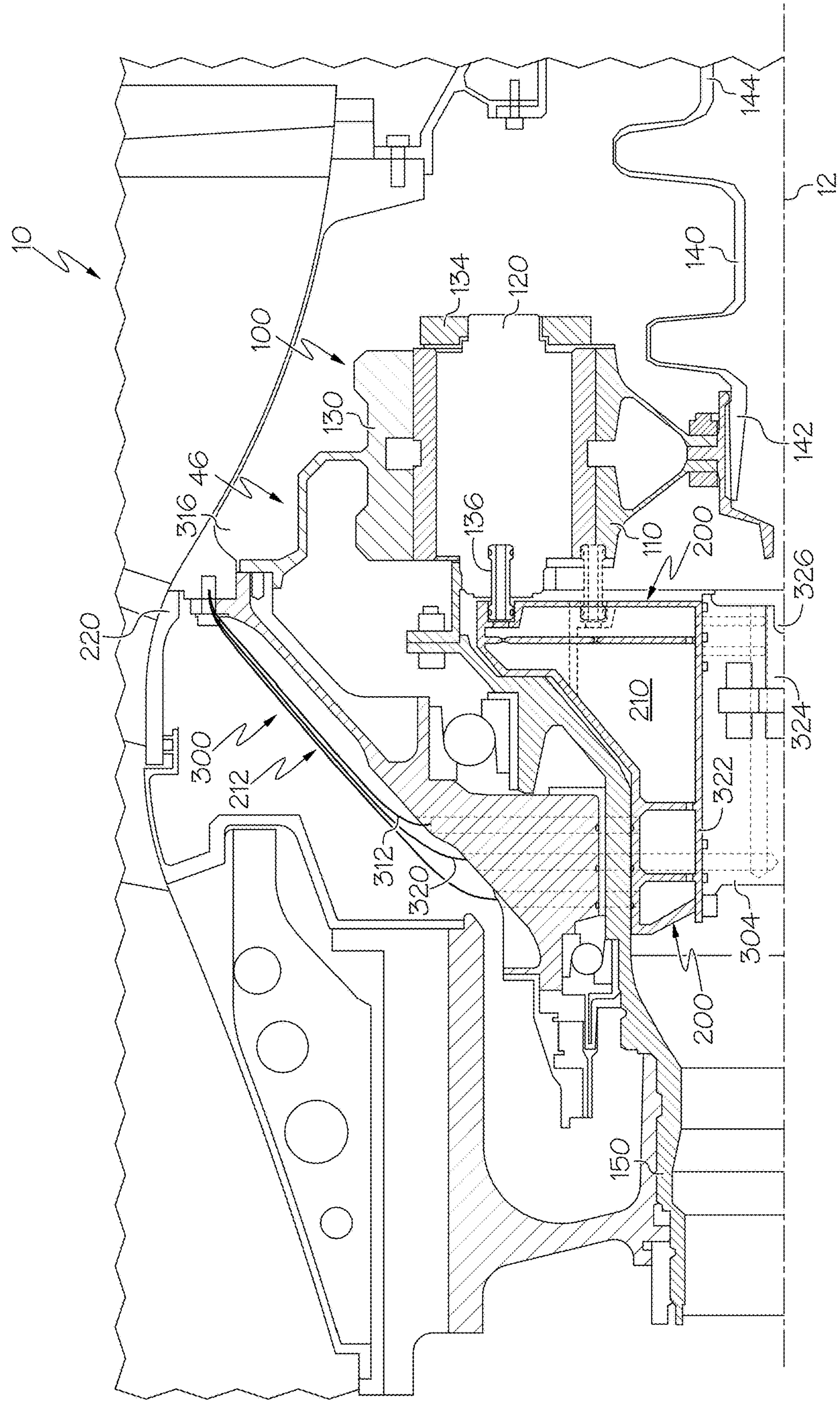
FIG. 2 schematically depicts a partial cross-sectional side view of the turbine engine of FIG. 1 including a planetary gearbox assembly, according to an embodiment of the present disclosure.

Referring now to FIG. 2, a partial cross-sectional side view of a planetary gear assembly 100. The planetary gearbox assembly 100 includes the planetary gearbox 46 and a lubrication system 300. In these embodiments, the planetary gear assembly 100 is configured to generate torque in order to drive the fan 38 (FIG. 1) of the turbine engine 10. In these embodiments, the planetary gear assembly 100 may include a sun gear 110, a plurality of planet gears 120 (only one of which is visible in FIG. 2), and a ring gear 130. The planetary gear assembly 100 may further include a planet carrier 134, which may be configured to secure the plurality of planet gears 120 in their relative positions, as will be described in additional detail herein.

Referring still to FIG. 2, an input shaft 140 may be coupled to the sun gear 110, and may be configured to introduce mechanical power to the planetary gear assembly 100. As depicted in FIG. 2, the input shaft 140 may include a first end 142 and a second end 144, with the first end 142 being coupled to the sun gear 110 and the second end 144 being coupled to a power source (e.g. via a coupling and/or clutching mechanism) that allows the input shaft 140 to transmit torque from the power source to the planetary gear assembly 100. In these embodiments, it should be appreciated that the input shaft 140 may rotate at a speed determined by the power source, and the rotational motion of the input shaft 140 may drive the planetary gear assembly 100.

Referring still to FIG. 2, the sun gear 110 may be centrally positioned within the planetary gear assembly 100 such that the remaining components (e.g., the plurality of planet gears 120) revolve and/or rotate about the sun gear 110. For example, the sun gear 110 may be a cylindrical gear having a plurality of outward facing teeth that are configured to engage the plurality of planet gears 120. Accordingly, in these embodiments, the sun gear 110 may be configured to distribute power from the input shaft 140 to the plurality of planet gears 120. As the sun gear 110 transfers power from the input shaft 140 to the plurality of planet gears 120, the sun gear 110 may cause the plurality of planet gears 120 to rotate about their axis and orbit (e.g., rotate) the sun gear 110.

In these embodiments, it should be appreciated that the size and tooth count of the sun gear 110 may impact the gear ratio of the planetary gear assembly 100. For example, the tooth count and size may impact the rotational speed and the torque conversion capabilities of the sun gear 110, which in turn may influence the rotation of the plurality of planet gears 120. In these embodiments, decreasing the tooth count of the sun gear 110 may allow the sun gear 110 to increase speed and decrease torque, while increasing the tooth count may allow the sun gear 110 to achieve an increased torque while reducing rotational speed.

Referring still to FIG. 2, and as has been described herein, the plurality of planet gears 120 may be coupled to the sun gear 110 such that rotational motion of the sun gear 110 is transferred to the plurality of planet gears 120. In these embodiments, the planet gears 120 may be relatively smaller gears (e.g., as compared to the sun gear 110) and may be mounted equidistantly around the sun gear 110. In these embodiments, each of the plurality of planet gears 120 may include a plurality of teeth, which may be configured to engage the teeth of the sun gear 110 and the ring gear 130, as will be described in additional detail herein. Although the planet gears 120 are described herein as being equidistantly spaced about the sun gear 110, it should be appreciated that, in some embodiments, the plurality of planet gears 120 may be variably spaced about the sun gear 110 without departing from the scope of the present disclosure.

In operation, the rotation and orbit of the plurality of planet gears 120 relative to the sun gear 110 may generate an output of the planetary gear assembly 100. For example, the plurality of planet gears 120 may be capable of increasing or decreasing the rotational speed of the output of the planetary gear assembly 100. The operation of the planetary gear assembly 100 and output will be described in additional detail herein with reference to FIG. 3.

Referring still to FIG. 2, the plurality of planet gears 120 may be further coupled to the planet carrier 134, which may be configured to hold and/or support the plurality of planet gears 120. In these embodiments, the planet carrier 134 may allow each of the plurality of planet gears 120 to orbit the sun gear 110 while rotating about each of their own axes. To allow for each of the planet gears 120 to rotate about their own axes as the planet gears 120 orbit the sun gear 110, each of the plurality of planet gears 120 may be mounted to the planet carrier 134 using a bearing 136. In these embodiments, the planet carrier 134 may ensure that each of the plurality of planet gears 120 are positioned at a desired distance from the sun gear 110, while the bearing 136 upon which each of the planet gears 120 is mounted allows for the planet gears 120 to rotate about their own axes.

In the embodiments described herein, the bearings 136 may be needle bearings, roller bearings (e.g., tapered roller bearings, etc.), ball bearings, or any other similar bearing capable of allowing the plurality of planet gears 120 to rotate about their axes. It should be appreciated that the bearings 136 may facilitate smooth rotation of the planet gears 120, and may be further configured to withstand the radial and tangential loads experienced by the plurality of planet gears 120 during operation of the planetary gear assembly 100. In addition, the bearings 136 may further aid in maintaining alignment of the plurality of planet gears 120 during operation of the planetary gear assembly 100, which may ensure that plurality of planet gears 120 maintain proper meshing with the sun gear 110 and are able to efficiently transfer power during operation.

As further illustrated in FIG. 2, the plurality of planet gears 120 may be further configured to interface with the ring gear 130. In these embodiments, the ring gear 130 may be an annular gear, or any other similar gear, having a plurality of teeth on an interior surface of the gear for engaging the plurality of planet gears 120. As depicted in FIG. 2, the ring gear 130 may encircle the planetary gear set (e.g., the plurality of planet gears 120 and sun gear 110) such that the ring gear 130 acts as a housing. In these embodiments, the planet carrier 134 transmits forces to the fan 38 (FIG. 1) to drive the turbine engine 10.

Referring still to FIG. 2, the planetary gear assembly 100 may further include an output shaft 150. In these embodiments, the output shaft 150 may be mechanically coupled to the planet carrier 134, which may be utilized to provide power to the output shaft 150. For example, in the embodiments described herein, when the plurality of planet gears 120 are driven and the sun gear 110 remains stationary, the plurality of planet gears 120 orbit the sun gear 110 and rotate against the ring gear 130. In these embodiments, rotation of the plurality of planet gears 120 against the ring gear 130 may cause the planet carrier 134 to rotate, thereby transferring power from the planet carrier 134 to the fan 38 (FIG. 1).

In these embodiments, the ring gear 130 is a stationary member, while the sun gear 110 is driven by the input shaft 140 and the planet carrier 134 transmits power via the planet gears 120. With the ring gear 130 configured as a stationary component, the rotation of the plurality of planet gears 120 cause the planet carrier 134 to rotate, with the rotation of the planet carrier 134 driving the output shaft 150. It should be appreciated that, in the embodiments described herein, the configuration of the output shaft 150 may be determined based on a desired gear ratio and power transfer efficiency within the planetary gear assembly 100.

Referring still to FIG. 2, the output shaft 150 may be further coupled to the fan 38 (FIG. 1), such that rotation of the output shaft 150 drives rotation of the fan 38 (FIG. 1) about the centerline axis 12 (FIG. 1). For example, in these embodiments, the output shaft 150 may be coupled to the fan shaft 45 (FIG. 1), such that rotation of the output shaft 150 drives the fan shaft 45, and in turn, the fan 38. In the embodiments described herein, the output shaft 150 may include a cylindrical rod, or any other similarly shaped shaft, formed of a material having a strength sufficient to withstand the torque and load transmitted by the output shaft 150 (e.g., steel, other similar alloys, etc.).

In the embodiments described herein, it should be appreciated that the speed at which the various components of the planetary gear assembly 100 rotate and the torque that is generated and transmitted across the planetary gear assembly 100 may be a function of the gear ratio within the planetary gear assembly 100 and the power input into the planetary gear assembly 100 (e.g., via the turbine section 27, as depicted in FIG. 1). Accordingly, it may be possible to adjust various features of the planetary gear assembly 100 (e.g., size and tooth count of the sun gear 110, planet gears 120, ring gear 130, etc.) as described herein to optimize the efficiency of the planetary gearbox 46 for a particular application.

Referring still to FIG. 2, to ensure that the various moving components of the planetary gearbox 46 remain properly lubricated during operation, lubrication system 300 may further include a lubricant transfer unit 200 configured to supply a lubricant (e.g., oil, etc.) to the planetary gear assembly 100, output shaft 150, and fan shaft 45. In these embodiments, the lubricant transfer unit 200 is positioned about at least a portion of the fan shaft 45, such that the lubricant transfer unit 200 is forwardly positioned relative the planetary gear assembly 100 and in a location which is insensitive to deflection and/or vibration caused by operation of the turbine engine 10. Furthermore, because the lubricant transfer unit 200 is positioned about the fan shaft 45, any lubricant leakage may be directed to the fan shaft 45 (FIG. 1) and used to lubricate the fan shaft bearings. In embodiments, the lubricant transfer unit 200 includes a reservoir 210 that maintains a volume of lubricant.

As further depicted in FIG. 2, the lubricant transfer unit 200 may include a plurality of lubricant lines 212, which may extend between an oil tank (described below with reference to FIG. 3), and the planetary gearbox 46. It should be appreciated that the plurality of lubricant lines 212 may be formed of any material capable of withstanding high-pressure and/or temperatures, such as stainless steel, reinforced synthetic materials, or any other similar materials, and may be configured to be both durable and flexible enough to accommodate movement and vibrations generated by the turbine engine 10 during operation.

Referring still to FIG. 2, a coaxial lube pump 304 is positioned within the lubricant transfer unit 200. The coaxial lube pump 304 includes a casing 322 and at least one rotating gear 324 within the casing 322. The casing 322 is coupled to and rotates with the output shaft 150 while the at least one rotating gear 324 inside the coaxial lube pump 304 is coupled to and driven by the high speed input shaft 140 via a sun gear shaft 326. The high speed input shaft 140, and the sun gear shaft 326, rotate at a higher speed than the output shaft 150, therefore the differential in the rotational speed between the coaxial lube pump components causes the pumping effect.

Figure 3:
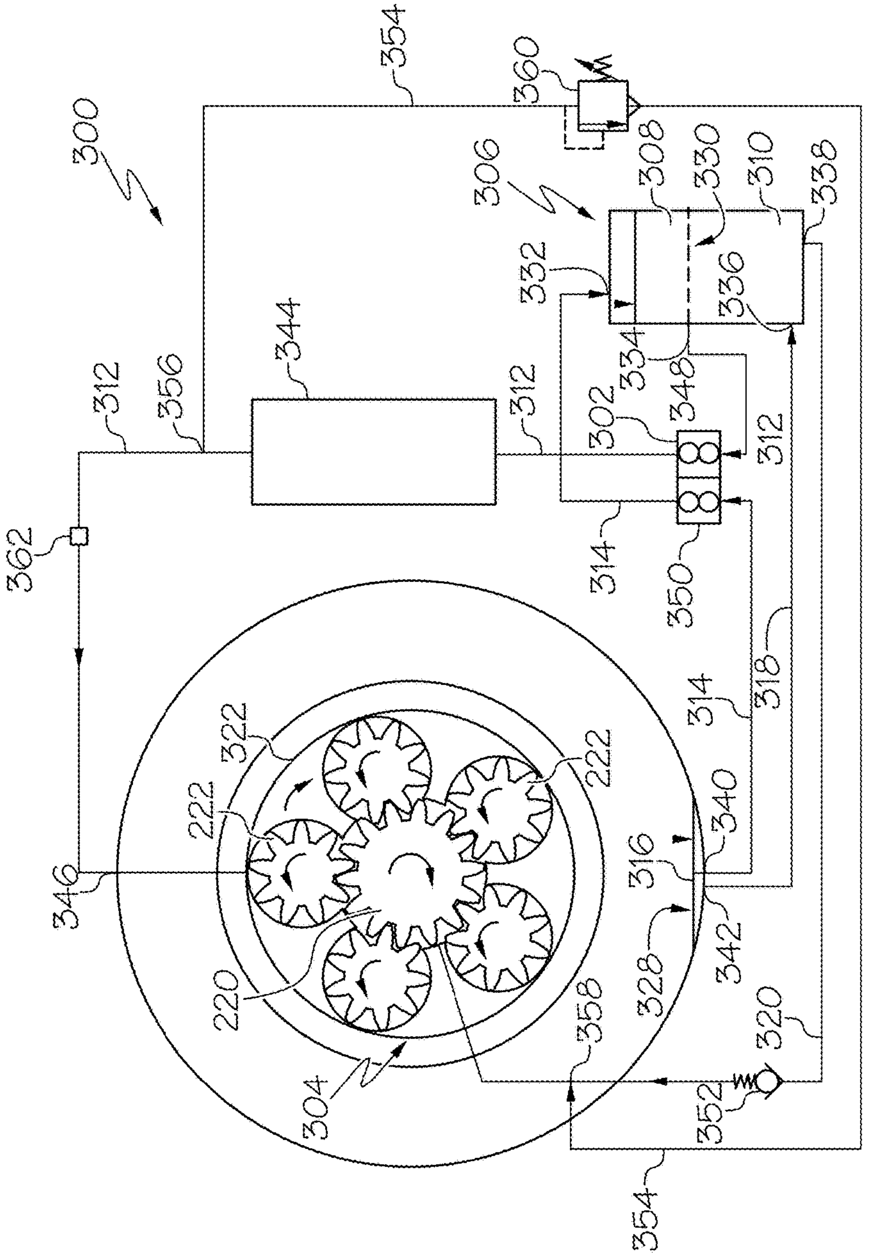
FIG. 3 schematically depicts a lubrication system including an integrated coaxial lube pump assembly for the planetary gearbox assembly of FIG. 2, according to an embodiment of the present disclosure.

More specifically, referring now to FIG. 3, the coaxial lube pump 304 is a coaxial gear pump and includes a coaxial pump sun gear 220 that is mechanically coupled to the input shaft 140 (FIG. 2) via the sun gear shaft 326 (FIG. 2) of the planetary gearbox 46 (FIG. 2). A plurality of coaxial pump planetary gears 222 rotate around the coaxial pump sun gear 220. Each coaxial pump planetary gear 222 rotates about its own axis. Further, each of the coaxial pump planetary gears 222 rotates with the casing 322. The casing 322 is mechanically coupled to and rotates with the output shaft 150 (FIG. 2). The difference in the rotational speed between the coaxial pump sun gear 220 and the casing 322 causes the pumping effect. FIG. 3 illustrates the coaxial pump sun gear 220 rotating in a clockwise direction, each of the coaxial pump planetary gears 222 rotating in a counter-clockwise direction, and the casing 322 rotating in a clockwise direction. Although five coaxial pump planetary gears 222 are illustrated, the disclosure is not limited to five coaxial pump planetary gears.

Referring still to FIG. 3, the lubrication system 300 for supplying lubricant (e.g., oil, etc.) to the planetary gearbox assembly 100 (FIG. 2) is schematically illustrated. The lubrication system 300 includes a main lube pump 302, the coaxial lube pump 304 that is coaxially coupled to the planetary gearbox 46 (not illustrated in FIG. 3), an oil tank 306 having a main section 308 and an auxiliary section 310, an oil supply line 312 in which the main lube pump 302 pumps oil from the main section 308 of the oil tank 306 to the planetary gearbox 46, a main scavenge line 314 in which the main lube pump 302 pumps oil from a sump 316 in the planetary gearbox 46 to the main section 308 in the oil tank 306, an auxiliary scavenge line 318 in which oil flows from the sump 316 in the planetary gearbox 46 to the auxiliary section 310 of the oil tank 306 by gravity, and an auxiliary feeding line 320 in which the coaxial lube pump 304 draws oil from the auxiliary section 310 of the oil tank 306 to the planetary gearbox 46. During normal operating conditions, when the pressure in the oil supply line 312 is equal to or exceeds a predetermined pressure threshold, both the main lube pump 302 and the coaxial lube pump 304 operate. However, during an emergency operating condition when the main lube pump 302 ceases operation or the pressure in the oil supply line 312 is below the predetermined pressure threshold, for example, during a situation in which there is no pressure in the oil supply line 312, the coaxial lube pump 304 draws oil from the auxiliary section 310 of the oil tank 306 through the auxiliary feeding line 320 to the planetary gearbox 46. This is possible during an emergency operating condition because the oil in the oil tank 306 is at the same level of the oil in the sump 316 by the principle of communicating vessels.

Referring still to FIG. 3, the oil tank 306 stores a supply of lubricant that is used to lubricate the gears and journal bearings within the planetary gearbox 46 during operation. As noted above, the oil tank 306 includes the main section 308, which is positioned vertically above the auxiliary section 310. Further, there is no physical boundary between the main section 308 and the auxiliary section 310. The oil tank 306 is positioned vertically relative to the sump 316 such that a top surface 328 of the volume of lubricant in the sump 316 is at the same vertical level of a boundary 330 between the main section 308 and the auxiliary section 310 of the oil tank 306. As discussed herein, the volume of lubricant in the auxiliary section 310 is available for use during a situation where there is a loss of pressure in the oil supply line 312, i.e., an emergency situation.

To permit the flow of oil into and out of the main section 308 and the auxiliary section 310 of the oil tank 306, the oil tank 306 includes a main section inlet 332, a main section outlet 334, an auxiliary section inlet 336, and an auxiliary section outlet 338. Additionally, the sump 316 includes a sump main outlet port 340 and a sump auxiliary outlet port 342 to facilitate the flow of oil out of the sump 316.

The position of the main section outlet 334 from the oil tank 306 determines the boundary 330 between the main section 308 and the auxiliary section 310. This configuration ensures that the volume of lubricant in the auxiliary section 310 is reserved for auxiliary feeding purposes only, due to gravity, and cannot be drawn into the oil supply line 312 from the main section 308.

The main lube pump 302 pumps, via a main lube pump first stage 348, lubricant through the oil supply line 312 from the main section 308 of the oil tank 306 to the planetary gearbox 46 by drawing lubricant from the main section outlet 334 through a heat exchanger 344. In embodiments, the oil may flow, either upstream or downstream of the heat exchanger 344 through one or more filters. Thereafter, the oil flows to the planetary gearbox 46 through an oil supply line inlet 346. The lubricant is dispersed through the planetary gearbox 46 to lubricate the gears and journal bearings via centrifugal force and collect in the sump 316. The journal bearings are particularly sensitive to oil starvation.

The main lube pump 302 may also include a main pump second stage 350 that pumps lubricant through the main scavenge line 314 from the sump 316 to the main section 308 of the oil tank 306. The main pump second stage 350 may also be referred to herein as a scavenge stage. The lubricant from the sump 316 is pumped out from the sump main outlet port 340, through the main scavenge line 314, and into the oil tank main section inlet 332.

In embodiments, the lubricant that runs through the main scavenge line 314 is mixed with air. In other embodiments, the lubricant that runs through the oil supply line 312 is not mixed with air. Therefore, the main pump second stage 350 is sized for a different volumetric oil flow than the main lube pump first stage 348.

The auxiliary scavenge line 318 extends from the sump auxiliary outlet port 342 to the oil tank auxiliary section inlet 336. Lubricant travels from the sump 316 through the auxiliary scavenge line 318 to the auxiliary section 310 of the oil tank 306 by the force of gravity.

The auxiliary feeding line 320 extends from the auxiliary section outlet 338 of the auxiliary section 310 of the oil tank 306 to the coaxial lube pump 304. The auxiliary feeding line 320 is positioned vertically below the auxiliary scavenge line 318. A check valve 352 is positioned within the auxiliary feeding line 320 to ensure the correct flow direction of lubricant from the oil tank 306 to the coaxial lube pump 304. During an emergency situation in which a pressure within the coaxial lube pump 304 is below a predetermined threshold pressure, lubricant is drawn out of the auxiliary section 310 of the oil tank 306 by the coaxial lube pump 304 through the auxiliary feeding line 320.

A priming line 354 extends from an oil supply line port 356 in the oil supply line 312 to an inlet port 358 in the auxiliary feeding line 320. The priming line 354 further includes a pressure regulating valve 360. The oil supply line port 356 is positioned in the oil supply line 312 downstream from the heat exchanger 344. The inlet port 358, where the priming line 354 feeds into the auxiliary feeding line 320, is positioned along the auxiliary feeding line 320 downstream from the check valve 352. The priming line 354 feeds lubricant to the auxiliary feeding line 320 to ensure that it is primed with lubricant.

When the pressure in the oil supply line 312 is equal to or exceeds the predetermined pressure threshold, a normal operating condition is satisfied such that both the main lube pump 302 and the coaxial lube pump 304 operate and the pressure regulating valve 360 is open. However, when the pressure in the oil supply line 312 is less than the predetermined pressure threshold, an emergency operating condition is satisfied, for example in this case the main lube pump 302 ceases operation, and the pressure regulating valve 360 closes. Closure of the pressure regulating valve 360 prevents oil from being drawn into the auxiliary feeding line 320 from the priming line 354.

Figure 4:
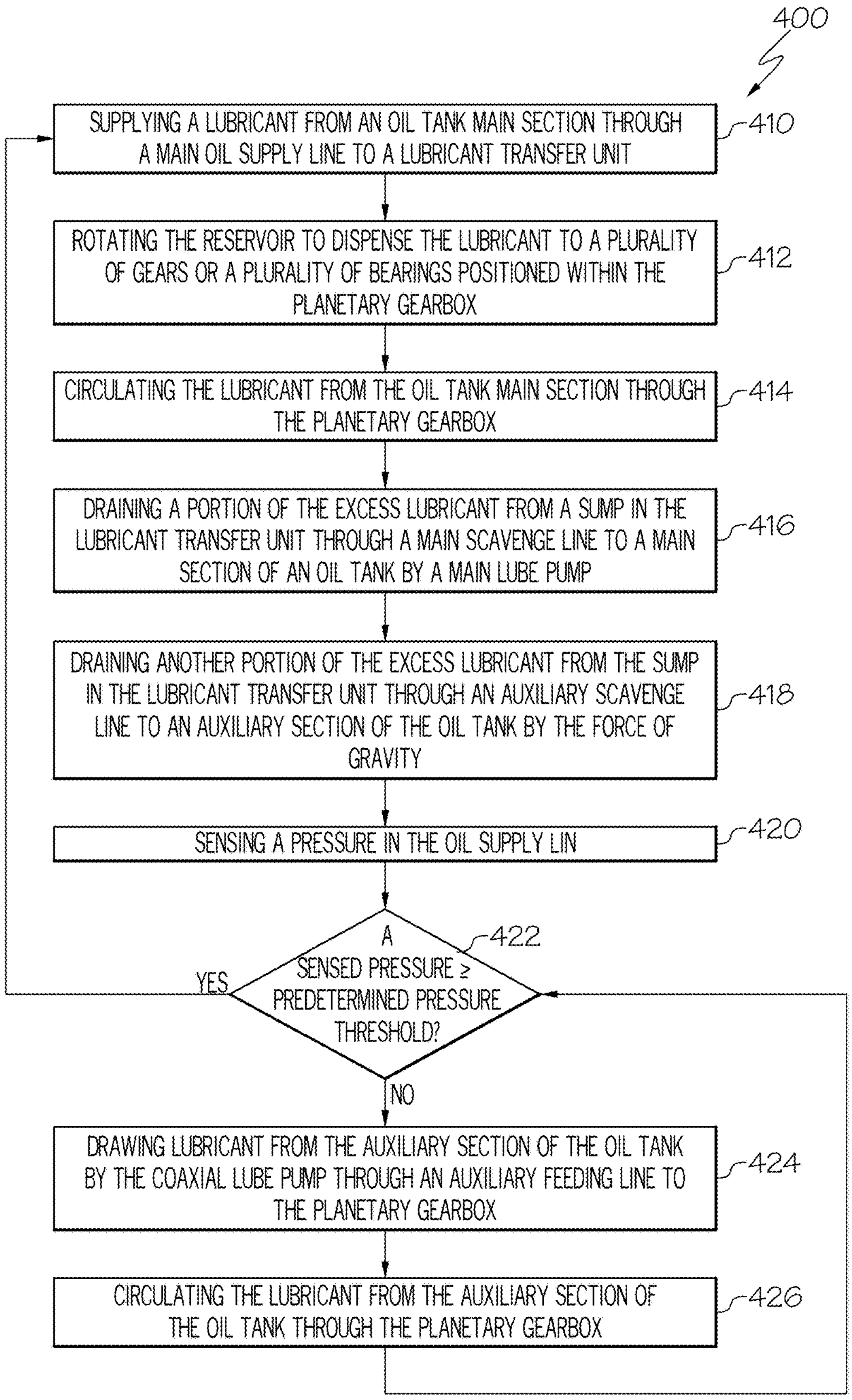
FIG. 4 schematically depicts a flow diagram of a method of supplying lubricant to a planetary gearbox using the integrated coaxial lube pump assembly of FIG. 3, according to one or more embodiments shown and described herein.

Turning now to FIG. 4, a method 400 of supplying lubricant to a planetary gearbox 46 of a turbine engine 10 using a coaxial lube pump 304 is depicted with reference to FIGS. 1-3. In these embodiments, the method 400 may initially involve supplying a lubricant from the main section 308 of the oil tank 306 through the oil supply line 312 to the lubricant transfer unit 200 that defines the reservoir 210, as shown in block 410. The lubricant transfer unit 200 is mounted on a fan shaft 45 of the turbine engine 10. Further the lubricant transfer unit 200 is segregated into a plurality of sectors and houses the coaxial lube pump 304 positioned within. The coaxial lube pump 304 is coaxially aligned with the input shaft 140 of the planetary gearbox 46. The method 400 may further include rotating the reservoir 210 to dispense the lubricant to a plurality of gears or a plurality of bearings positioned within the planetary gearbox 46, as shown in block 412. The method 400 then advances to block 414, which includes circulating the lubricant from the main section 308 of the oil tank 306 through the planetary gearbox 46.

Once the lubricant is circulated through the planetary gearbox 46, the method 400 advances to block 416, which involves draining a portion of the excess lubricant from a sump 316 in the lubricant transfer unit 200 through a main scavenge line 314 to the main section 308 of the oil tank 306 by the main lube pump 302. Further, the method 400 includes draining another portion of the excess lubricant from the sump 316 in the lubricant transfer unit 200 through an auxiliary scavenge line 318 to the auxiliary section 310 of the oil tank 306 by the force of gravity, as shown in block 418.

The method 400 advances to block 420, which involves sensing a pressure in the oil supply line 312. Once the pressure in the oil supply line 312 is detected, the method 400 advances to block 422, which involves determining whether a sensed pressure is equal to or exceeds the predetermined pressure threshold. When the sensed pressure is equal or exceeds the predetermined pressure threshold, the lubrication system operates in the normal operation mode and the method 400 returns to block 410, supplying the lubricant from the main section 308 of the oil tank 306 through the oil supply line 312 to the planetary gearbox 46 through the lubricant transfer unit 200.

When the sensed pressure is less than the predetermined pressure threshold, the lubrication system operates in the emergency operation mode and the method 400 advances to block 424, which involves drawing lubricant from the auxiliary section 310 of the oil tank 306 by the coaxial lube pump 304 through the auxiliary feeding line 320 to the planetary gearbox 46. The method 400 then advances to block 426, which involves circulating the lubricant from the auxiliary section 310 of the oil tank 306 through the planetary gearbox 46 when the sensed pressure in the oil supply line 312 is less than the predetermined pressure threshold. The lubricant will continue in this circulation pattern until a sensor 362 determines that the pressure within the oil supply line 312 is equal to or exceeds the predetermined pressure threshold.

In view of the foregoing, it is to be appreciated that defined herein are turbine engines, integrated in-line lube pump assemblies for a planetary gearbox, and methods of supplying lubrication to a planetary gearbox of a turbine engine during an emergency situation. As has been described herein, the in-line lube pump assemblies provide a consistent supply of lubricant to the planetary gearbox to be used in an emergency event, such as when there is a drop in pressure in the main lubricant supply line. Further, as has been described, the in-line pump assemblies provide a pumping source to pump lubricant from to the planetary gearbox during an emergency event, such as when the main pump ceases to operate.

Further aspects of the embodiments described herein are provided by the subject matter of the following clauses:

An integrated in-line emergency lube pump assembly for a planetary gearbox comprising: a main lube pump; a coaxial lube pump coaxially aligned with and coupled to the planetary gearbox; an oil tank having a main section and an auxiliary section; an oil supply line fluidly connecting the main section of the oil tank to the planetary gearbox; a main scavenge line fluidly connecting a sump of the planetary gearbox to the main section of the oil tank; an auxiliary scavenge line fluidly connecting the sump of the planetary gearbox to the auxiliary section of the oil tank; and an auxiliary feeding line fluidly connecting the auxiliary tank to the planetary gearbox, wherein when a pressure in the oil supply line is equal to or exceeds a predetermined pressure threshold, the main pump is operated to pump oil from the main section of the oil tank to the planetary gearbox, wherein when the pressure in the oil supply line is less than the predetermined pressure threshold, the main lube pump ceases operation, which causes the coaxial lube pump to draw oil from the auxiliary section of the oil tank to the planetary gearbox.

The integrated in-line emergency lube pump assembly of the preceding clause, further comprising a priming line that extends from the oil supply line to the auxiliary feeding line.

The integrated in-line emergency lube pump assembly of any of the preceding clauses, further comprising a pressure regulating valve positioned in the priming line; and wherein when the detected pressure in the oil supply line is equal to or exceeds a predetermined pressure threshold, the pressure regulating valve is in an open position and when the detected pressure in the oil supply line is below the predetermined pressure threshold, the pressure regulating valve transitions to a closed position.

The integrated in-line emergency lube pump assembly of any of the preceding clauses, further comprising a check valve in the auxiliary feeding line.

The integrated in-line emergency lube pump assembly of any of the preceding clauses, wherein: the priming line includes an oil supply line port and an inlet port, the oil supply line port is in the oil supply line downstream from the main pump and upstream from the planetary gearbox; and the inlet port is in the auxiliary feeding line downstream from the check valve.

The integrated in-line emergency lube pump assembly of any of the preceding clauses, wherein the auxiliary section of the oil tank is positioned vertically below the main section of the oil tank.

The integrated in-line emergency lube pump assembly of any of the preceding clauses, wherein there is no physical boundary separating the auxiliary section and the main section in the oil tank.

The integrated in-line emergency lube pump assembly of any of the preceding clauses, wherein a position of a main section outlet from the oil tank determines a division between the main section and the auxiliary section in the oil tank.

The integrated in-line emergency lube pump assembly of any of the preceding clauses, wherein the auxiliary feeding line is positioned vertically below the auxiliary scavenge line.

The integrated in-line emergency lube pump assembly of any of the preceding clauses, wherein: the coaxial lube pump includes a casing and at least one gear positioned within the casing; the casing is mechanically coupled to and rotates with an output shaft and the at least one gear is mechanically coupled to and rotates with the planetary gearbox via a sun gear shaft; and the casing of the coaxial lube pump and the output shaft rotate at a first rotational speed and the at least one gear of the coaxial lube pump and the coupled sun gear shaft rotate at a second rotational speed.

The integrated in-line emergency lube pump assembly of any of the preceding clauses, wherein the first rotational speed is less than the second rotational speed.

The integrated in-line emergency lube pump assembly of any of the preceding clauses, wherein the coaxial lube pump is a coaxial gear pump.

The integrated in-line emergency lube pump assembly of any of the preceding clauses, wherein the main lube pump pumps lubricant through the oil supply line from the main section of the oil tank to the planetary gearbox by drawing lubricant from the main section outlet through a heat exchanger through a main lube pump first stage.

The integrated in-line emergency lube pump assembly of any of the preceding clauses, wherein the oil flows through one or more filters positioned either upstream or downstream of the heat exchanger.

The integrated in-line emergency lube pump assembly of any of the preceding clauses, wherein the oil flows to the planetary gearbox through an oil supply line inlet.

The integrated in-line emergency lube pump assembly of any of the preceding clauses, wherein the lubricant is dispersed through the planetary gearbox to lubricate the gears and journal bearings via centrifugal force and collect in the sump.

The integrated in-line emergency lube pump assembly of any of the preceding clauses, wherein the main lube pump further includes a main pump second stage that pumps lubricant through the main scavenge line from the sump to the main section of the oil tank.

The integrated in-line emergency lube pump assembly of any of the preceding clauses, wherein the lubricant from the sump is pumped out from the sump main outlet port, through the main scavenge line, and into the oil tank main section inlet.

The integrated in-line emergency lube pump assembly of any of the preceding clauses, wherein the lubricant that runs through the main scavenge line is mixed with air.

The integrated in-line emergency lube pump assembly of any of the preceding clauses, wherein the lubricant that runs through the oil supply line is not mixed with air.

The integrated in-line emergency lube pump assembly of any of the preceding clauses, wherein the main pump second stage is sized for a different volumetric oil flow than the main lube pump first stage.

The integrated in-line emergency pump assembly of any of the preceding clauses, wherein the auxiliary scavenge line extends from the sump auxiliary outlet port to the oil tank auxiliary section inlet.

The integrated in-line emergency pump assembly of any of the preceding clauses, wherein lubricant travels from the sump through the auxiliary scavenge line to the auxiliary section of the oil tank by the force of gravity.

The integrated in-line emergency pump assembly of any of the preceding clauses, wherein the auxiliary feeding line extends from the auxiliary section outlet of the auxiliary section of the oil tank to the coaxial lube pump.

The integrated in-line emergency pump assembly of any of the preceding clauses, wherein the check valve is positioned within the auxiliary feeding line to ensure the correct flow direction of lubricant from the oil tank to the coaxial lube pump.

The integrated in-line emergency pump assembly of any of the preceding clauses, wherein when a pressure within the coaxial lube pump is below a predetermined threshold pressure, lubricant is drawn out of the auxiliary section of the oil tank by the coaxial lube pump through the auxiliary feeding line.

The integrated in-line emergency pump assembly of any of the preceding clauses, wherein the priming line extends from an oil supply line port in the oil supply line to an inlet port in the auxiliary feeding line.

The integrated in-line emergency pump assembly of any of the preceding clauses, wherein the oil supply line port is positioned in the oil supply line downstream from the heat exchanger.

The integrated in-line emergency pump assembly of any of the preceding clauses, wherein the inlet port is where the of the priming line feeds into the auxiliary feeding line and is positioned along the auxiliary feeding line downstream from the check valve.

The integrated in-line emergency pump assembly of any of the preceding clauses, wherein the priming line feeds lubricant to the auxiliary feeding line to ensure that it is primed with lubricant.

The integrated in-line emergency pump assembly of any of the preceding clauses, wherein when the pressure in the oil supply line is equal to or exceeds the predetermined pressure threshold, a normal operating condition is satisfied such that both the main lube pump and the coaxial lube pump operate and the pressure regulating valve is open.

The integrated in-line emergency pump assembly of any of the preceding clauses, wherein when the pressure in the oil supply line is less than the predetermined pressure threshold, an emergency operating condition is satisfied and the main lube pump ceases operation, and the pressure regulating valve closes.

The integrated in-line emergency pump assembly of any of the preceding clauses, wherein closure of the pressure regulating valve prevents oil from being drawn into the auxiliary feeding line from the priming line.

The integrated in-line emergency pump assembly of any of the preceding clauses, wherein the planetary gearbox assembly includes the planetary gearbox and the a lubrication system.

The integrated in-line emergency pump assembly of any of the preceding clauses, wherein the planetary gearbox includes a planetary gear assembly, which is configured to generate torque in order to drive the fan of the turbine engine.

The integrated in-line emergency pump assembly of any of the preceding clauses, wherein the gear assembly includes a sun gear, a plurality of planet gears, and a ring gear.

The integrated in-line emergency pump assembly of any of the preceding clause, wherein the planetary gear assembly further includes a planet carrier configured to secure the plurality of planet gears in their relative positions, A turbine engine comprising: a fan; a fan shaft coupled to the fan, the fan shaft configured to rotate the fan; a turbine shaft; a planetary gearbox coupled to the turbine shaft and the fan shaft, such that the planetary gearbox transfers rotational motion from the turbine shaft to the fan shaft; a lubricant transfer unit that defines a reservoir, the lubricant transfer unit mounted on the fan shaft; and an integrated in-line emergency lube pump assembly for the planetary gear assembly including: a main lube pump; a coaxial lube pump, positioned within the lubricant transfer unit, that is coaxially engaged and aligned with the planetary gearbox; an oil tank having a main section and an auxiliary section; an oil supply line fluidly connecting the main section of the oil tank to the planetary gearbox; a main scavenge line fluidly connecting a sump in the planetary gearbox to the main section of the oil tank; an auxiliary scavenge line fluidly connecting the sump of the planetary gearbox to the auxiliary section of the oil tank; an auxiliary scavenge feed line fluidly connecting the auxiliary section of the oil tank to the planetary gearbox; and wherein: when a pressure in the oil supply line is equal to or exceeds a predetermined threshold, the main pump is operated to pump oil from the main section of the oil tank to the planetary gearbox; and when the pressure in the oil supply line is less than the predetermined pressure threshold, the main lube pump ceases operation, which causes the coaxial lube pump to draw oil from the auxiliary section of the oil tank to the planetary gearbox.

The turbine engine of any of the preceding clauses, wherein the coaxial lube pump includes a casing and at least one gear positioned within the casing, wherein the coaxial lube pump casing is mechanically coupled to and rotates with the fan shaft at a first rotational speed and the at least one coaxial lube pump gear is mechanically coupled to and rotates with the planetary gearbox via a sun gear shaft at a second rotational speed, and the first rotational speed is less than the second rotational speed.

The turbine engine of any of the preceding clauses, wherein the auxiliary section of the oil tank is positioned vertically below the main section of the oil tank and an oil upper surface level in the sump determines a division between the main section and the auxiliary section in the oil tank.

The turbine engine of any of the preceding clauses, wherein a position of a main section outlet from the oil tank determines a division between the main section and the auxiliary section in the oil tank.

The turbine engine of the preceding clause, further comprising a priming line that extends from the oil supply line to the auxiliary feeding line.

The turbine engine of any of the preceding clauses, further comprising a pressure regulating valve positioned in the priming line; and wherein when the detected pressure in the oil supply line is equal to or exceeds a predetermined pressure threshold, the pressure regulating valve is in an open position and when the detected pressure in the oil supply line is below the predetermined pressure threshold, the pressure regulating valve transitions to a closed position.

The turbine engine of any of the preceding clauses, further comprising a check valve in the auxiliary feeding line.

The turbine engine of any of the preceding clauses, wherein: the priming line includes an oil supply line port and an inlet port, the oil supply line port is in the oil supply line downstream from the main pump and upstream from the planetary gearbox; and the inlet port is in the auxiliary feeding line downstream from the check valve.

The turbine engine of any of the preceding clauses, wherein there is no physical boundary separating the auxiliary section and the main section in the oil tank.

The turbine engine of any of the preceding clauses, wherein the auxiliary feeding line is positioned vertically below the auxiliary scavenge line.

The turbine engine of any of the preceding clauses, wherein the first rotational speed is less than the second rotational speed.

The turbine engine of any of the preceding clauses, wherein the coaxial lube pump is a coaxial gear pump.

The turbine engine of any of the preceding clauses, wherein the main lube pump pumps lubricant through the oil supply line from the main section of the oil tank to the planetary gearbox by drawing lubricant from the main section outlet through a heat exchanger through a main lube pump first stage.

The turbine engine of any of the preceding clauses, wherein the oil flows through one or more filters positioned either upstream or downstream of the heat exchanger.

The turbine engine of any of the preceding clauses, wherein the oil flows to the planetary gearbox through an oil supply line inlet.

The turbine of any of the preceding clauses, wherein the lubricant is dispersed through the planetary gearbox to lubricate the gears and journal bearings via centrifugal force and collect in the sump.

The turbine engine of any of the preceding clauses, wherein the main lube pump further includes a main pump second stage that pumps lubricant through the main scavenge line from the sump to the main section of the oil tank.

The turbine engine of any of the preceding clauses, wherein the lubricant from the sump is pumped out from the sump main outlet port, through the main scavenge line, and into the oil tank main section inlet.

The turbine engine of any of the preceding clauses, wherein the lubricant that runs through the main scavenge line is mixed with air.

The turbine engine of any of the preceding clauses, wherein the lubricant that runs through the oil supply line is not mixed with air.

The turbine engine any of the preceding clauses, wherein the main pump second stage is sized for a different volumetric oil flow than the main lube pump first stage.

The turbine engine of any of the preceding clauses, wherein the auxiliary scavenge line extends from the sump auxiliary outlet port to the oil tank auxiliary section inlet.

The turbine engine of any of the preceding clauses, wherein lubricant travels from the sump through the auxiliary scavenge line to the auxiliary section of the oil tank by the force of gravity.

The turbine engine of any of the preceding clauses, wherein the auxiliary feeding line extends from the auxiliary section outlet of the auxiliary section of the oil tank to the coaxial lube pump.

The turbine engine of any of the preceding clauses, wherein the check valve is positioned within the auxiliary feeding line to ensure the correct flow direction of lubricant from the oil tank to the coaxial lube pump.

The turbine engine of any of the preceding clauses, wherein when a pressure within the coaxial lube pump is below a predetermined threshold pressure, lubricant is drawn out of the auxiliary section of the oil tank by the coaxial lube pump through the auxiliary feeding line.

The turbine engine of any of the preceding clauses, wherein the priming line extends from a an oil supply line port in the oil supply line to an inlet port in the auxiliary feeding line.

The turbine engine of any of the preceding clauses, wherein the oil supply line port is positioned in the oil supply line downstream from the heat exchanger.

The turbine engine of any of the preceding clauses, wherein the inlet port is where the priming line feeds into the auxiliary feeding line and is positioned along the auxiliary feeding line downstream from the check valve.

The turbine engine of any of the preceding clauses, wherein the priming line feeds lubricant to the auxiliary feeding line to ensure that it is primed with lubricant.

The turbine engine of any of the preceding clauses, wherein when the pressure in the oil supply line is equal to or exceeds the predetermined pressure threshold, a normal operating condition is satisfied such that both the main lube pump and the coaxial lube pump operate and the pressure regulating valve is open.

The turbine engine of any of the preceding clauses, wherein when the pressure in the oil supply line is less than the predetermined pressure threshold, an emergency operating condition is satisfied and the main lube pump ceases operation, and the pressure regulating valve closes.

The turbine engine of any of the preceding clauses, wherein closure of the pressure regulating valve prevents oil from being drawn into the auxiliary feeding line from the priming line.

The turbine engine of any of the preceding clauses, wherein the planetary gearbox assembly includes the planetary gearbox and the a lubrication system.

The turbine engine of any of the preceding clauses, wherein the planetary gearbox includes a planetary gear assembly, which is configured to generate torque in order to drive the fan of the turbine engine.

The turbine engine of any of the preceding clauses, wherein the gear assembly includes a sun gear, a plurality of planet gears, and a ring gear.

The turbine engine of any of the preceding clause, wherein the planetary gear assembly further includes a planet carrier configured to secure the plurality of planet gears in their relative positions, A method of supplying lubricant to a planetary gearbox of a turbine engine comprising: supplying a lubricant from a main section of an oil tank through an oil supply line to a lubricant transfer unit that contains a coaxial lube pump that is coaxially aligned with and mechanically coupled to an input shaft of a planetary gearbox; dispensing the lubricant to a plurality of gears or a plurality of bearings positioned within the planetary gearbox; circulating the lubricant from the main section of the oil tank through the planetary gearbox; draining a portion of the excess lubricant from a sump in the lubricant transfer unit through a main scavenge line to a main section of the oil tank by a main lube pump; draining another portion of the excess lubricant from the sump in the lubricant transfer unit through an auxiliary scavenge line to an auxiliary section of the oil tank by the force of gravity; and in response to determining that a pressure in the oil supply line is less than a predetermined pressure threshold: drawing lubricant from the auxiliary section of the oil tank by the coaxial lube pump through an auxiliary feed line to the planetary gearbox; and circulating the lubricant from the auxiliary section of the oil tank through the planetary gearbox.

The method of any of the preceding clauses, wherein the auxiliary feed line includes a check valve.

The method of any of the preceding clauses, further comprising supplying lubricant to prime the auxiliary feed line through a priming line, wherein the priming line extends from an oil supply line port to an inlet port in the auxiliary feed line downstream from the auxiliary feed line check valve.

The method of any of the preceding clauses, further comprising closing a pressure regulating valve that is positioned within the priming line when the pressure is less than the predetermined pressure threshold.

The method of any of the preceding clauses, wherein the oil supply line port is in the oil supply line downstream from the main pump and upstream from the planetary gearbox.

The method of any of the preceding clauses, wherein the auxiliary section of the oil tank is positioned vertically below the main section of the oil tank.

The method of any of the preceding clauses, wherein there is no physical boundary separating the auxiliary section and the main section in the oil tank.

The method of any of the preceding clauses, wherein a position of a main section outlet from the oil tank determines a division between the main section and the auxiliary section in the oil tank.

The method of any of the preceding clauses, wherein the auxiliary feeding line is positioned vertically below the auxiliary scavenge line.

The method of any of the preceding clauses, wherein: the coaxial lube pump includes a casing and at least one gear positioned within the casing; the casing is mechanically coupled to and rotates with an output shaft and the at least one gear is mechanically coupled to and rotates with the planetary gearbox via a sun gear shaft; and the casing of the coaxial lube pump and the output shaft rotate at a first rotational speed and the at least one gear of the coaxial lube pump and the coupled sun gear shaft rotate at a second rotational speed.

The method of any of the preceding clauses, wherein the first rotational speed is less than the second rotational speed.

The method of any of the preceding clauses, wherein the coaxial lube pump is a coaxial gear pump.

The method of any of the preceding clauses, wherein the main lube pump pumps lubricant through the oil supply line from the main section of the oil tank to the planetary gearbox by drawing lubricant from the main section outlet through a heat exchanger through a main lube pump first stage.

The method of any of the preceding clauses, wherein the oil flows through one or more filters positioned either upstream or downstream of the heat exchanger.

The method of any of the preceding clauses, wherein the oil flows to the planetary gearbox through an oil supply line inlet.

The method of any of the preceding clauses, wherein the lubricant is dispersed through the planetary gearbox to lubricate the gears and journal bearings via centrifugal force and collect in the sump.

The method of any of the preceding clauses, wherein the main lube pump further includes a main pump second stage that pumps lubricant through the main scavenge line from the sump to the main section of the oil tank.

The method of any of the preceding clauses, wherein the lubricant from the sump is pumped out from the sump main outlet port, through the main scavenge line, and into the oil tank main section inlet.

The method of any of the preceding clauses, wherein the lubricant that runs through the main scavenge line is mixed with air.

The method of any of the preceding clauses, wherein the lubricant that runs through the oil supply line is not mixed with air.

The method of any of the preceding clauses, wherein the main pump second stage is sized for a different volumetric oil flow than the main lube pump first stage.

The method of any of the preceding clauses, wherein the auxiliary scavenge line extends from the sump auxiliary outlet port to the oil tank auxiliary section inlet.

The method of any of the preceding clauses, wherein lubricant travels from the sump through the auxiliary scavenge line to the auxiliary section of the oil tank by the force of gravity.

The method of any of the preceding clauses, wherein the auxiliary feeding line extends from the auxiliary section outlet of the auxiliary section of the oil tank to the coaxial lube pump.

The method of any of the preceding clauses, wherein the check valve is positioned within the auxiliary feeding line to ensure the correct flow direction of lubricant from the oil tank to the coaxial lube pump.

The method of any of the preceding clauses, wherein when a pressure within the coaxial lube pump is below a predetermined threshold pressure, lubricant is drawn out of the auxiliary section of the oil tank by the coaxial lube pump through the auxiliary feeding line.

The method of any of the preceding clauses, wherein the priming line extends from an oil supply line port in the oil supply line to an inlet port in the auxiliary feeding line.

The method of any of the preceding clauses, wherein the oil supply line port is positioned in the oil supply line downstream from the heat exchanger.

The method of any of the preceding clauses, wherein the inlet port is where the priming line feeds into the auxiliary feeding line and is positioned along the auxiliary feeding line downstream from the check valve.

The method of any of the preceding clauses, wherein the priming line feeds lubricant to the auxiliary feeding line to ensure that it is primed with lubricant.

The method of any of the preceding clauses, wherein when the pressure in the oil supply line is equal to or exceeds the predetermined pressure threshold, a normal operating condition is satisfied such that both the main lube pump and the coaxial lube pump operate and the pressure regulating valve is open.

The method of any of the preceding clauses, wherein when the pressure in the oil supply line is less than the predetermined pressure threshold, an emergency operating condition is satisfied and the main lube pump ceases operation, and the pressure regulating valve closes.

The method of any of the preceding clauses, wherein closure of the pressure regulating valve prevents oil from being drawn into the auxiliary feeding line from the priming line.

The method of any of the preceding clauses, wherein the planetary gearbox assembly includes the planetary gearbox and the a lubrication system.

The method of any of the preceding clauses, wherein the planetary gearbox includes a planetary gear assembly, which is configured to generate torque in order to drive the fan of the turbine engine.

The method of any of the preceding clauses, wherein the gear assembly includes a sun gear, a plurality of planet gears, and a ring gear.

The method of any of the preceding clauses, wherein the planetary gear assembly further includes a planet carrier configured to secure the plurality of planet gears in their relative positions, It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. An integrated in-line emergency lube pump assembly for a planetary gearbox, comprising:
- a main lube pump;
- a coaxial lube pump coaxially aligned with and coupled to the planetary gearbox;
- an oil tank having a main section and an auxiliary section;
- an oil supply line fluidly connecting the main section of the oil tank to the planetary gearbox;
- a main scavenge line fluidly connecting a sump of the planetary gearbox to the main section of the oil tank;
- an auxiliary scavenge line fluidly connecting the sump of the planetary gearbox to the auxiliary section of the oil tank; and
- an auxiliary feeding line fluidly connecting the auxiliary section of the oil tank to the planetary gearbox,
- wherein when a pressure in the oil supply line is equal to or exceeds a predetermined pressure threshold, the main lube pump is operated to pump oil from the main section of the oil tank to the planetary gearbox,
- wherein when the pressure in the oil supply line is less than the predetermined pressure threshold, the main lube pump ceases operation, which causes the coaxial lube pump to draw oil from the auxiliary section of the oil tank to the planetary gearbox.

2. The integrated in-line emergency lube pump assembly of claim 1, further comprising a priming line that extends from the oil supply line to the auxiliary feeding line.

3. The integrated in-line emergency lube pump assembly of claim 2, further comprising a pressure regulating valve positioned in the priming line; and
- wherein when a detected pressure in the oil supply line is equal to or exceeds the predetermined pressure threshold, the pressure regulating valve is in an open position and when the detected pressure in the oil supply line is below the predetermined pressure threshold, the pressure regulating valve transitions to a closed position.

4. The integrated in-line emergency lube pump assembly of claim 3, further comprising a check valve in the auxiliary feeding line.

5. The integrated in-line emergency lube pump assembly of claim 4, wherein:
- the priming line includes an oil supply line port and an inlet port,
- the oil supply line port is in the oil supply line downstream from the main lube pump and upstream from the planetary gearbox; and
- the inlet port is in the auxiliary feeding line downstream from the check valve.

6. The integrated in-line emergency lube pump assembly of claim 1, wherein the auxiliary section of the oil tank is positioned vertically below the main section of the oil tank.

7. The integrated in-line emergency lube pump assembly of claim 6, wherein there is no physical boundary separating the auxiliary section and the main section in the oil tank.

8. The integrated in-line emergency lube pump assembly of claim 7, wherein a position of a main section outlet from the oil tank determines a division between the main section and the auxiliary section in the oil tank.

9. The integrated in-line emergency lube pump assembly of claim 8, wherein the auxiliary feeding line is positioned vertically below the auxiliary scavenge line.

10. The integrated in-line emergency lube pump assembly of claim 1, wherein:
the coaxial lube pump includes a casing and at least one gear positioned within the casing;
the casing is mechanically coupled to and rotates with an output shaft and the at least one gear is mechanically coupled to and rotates with the planetary gearbox via a sun gear shaft; and
the casing of the coaxial lube pump and the output shaft rotate at a first rotational speed and the at least one gear of the coaxial lube pump and the sun gear shaft rotate at a second rotational speed.

11. The integrated in-line emergency lube pump assembly of claim 10, wherein the first rotational speed is less than the second rotational speed.

12. The integrated in-line emergency lube pump assembly of claim 1, wherein the coaxial lube pump is a coaxial gear pump.

13. A turbine engine comprising:
a fan;
a fan shaft coupled to the fan, the fan shaft configured to rotate the fan;
a turbine shaft;
a planetary gearbox coupled to the turbine shaft and the fan shaft, such that the planetary gearbox transfers rotational motion from the turbine shaft to the fan shaft;
a lubricant transfer unit that defines a reservoir, the lubricant transfer unit mounted on the fan shaft; and
an integrated in-line emergency lube pump assembly for the planetary gearbox including:
a main lube pump;
a coaxial lube pump, positioned within the lubricant transfer unit, that is coaxially engaged and aligned with the planetary gearbox;
an oil tank having a main section and an auxiliary section;
an oil supply line fluidly connecting the main section of the oil tank to the planetary gearbox;
a main scavenge line fluidly connecting a sump in the planetary gearbox to the main section of the oil tank;
an auxiliary scavenge line fluidly connecting the sump of the planetary gearbox to the auxiliary section of the oil tank;
an auxiliary feeding line fluidly connecting the auxiliary section of the oil tank to the planetary gearbox; and
wherein:
when a pressure in the oil supply line is equal to or exceeds a predetermined threshold, the main lube pump is operated to pump oil from the main section of the oil tank to the planetary gearbox; and
when the pressure in the oil supply line is less than the predetermined threshold, the main lube pump ceases operation, which causes the coaxial lube pump to draw oil from the auxiliary section of the oil tank to the planetary gearbox.

14. The turbine engine of claim 13, wherein the coaxial lube pump includes a casing and at least one gear positioned within the casing,
wherein the casing of the coaxial lube pump is mechanically coupled to and rotates with the fan shaft at a first rotational speed and the at least one gear of the coaxial lube pump is mechanically coupled to and rotates with the planetary gearbox via a sun gear shaft at a second rotational speed, and
the first rotational speed is less than the second rotational speed.

15. The turbine engine of claim 13, wherein the auxiliary section of the oil tank is positioned vertically below the main section of the oil tank and an oil upper surface level in the sump determines a division between the main section and the auxiliary section in the oil tank.

16. The turbine engine of claim 13, wherein a position of a main section outlet from the oil tank determines a division between the main section and the auxiliary section in the oil tank.

17. A method of supplying lubricant to a planetary gearbox of a turbine engine comprising:
supplying a lubricant from a main section of an oil tank through an oil supply line to a lubricant transfer unit that contains a coaxial lube pump that is coaxially aligned with and mechanically coupled to an input shaft of the planetary gearbox;
dispensing the lubricant to a plurality of gears or a plurality of bearings positioned within the planetary gearbox;
circulating the lubricant from the main section of the oil tank through the planetary gearbox;
draining a portion of excess lubricant from a sump in the lubricant transfer unit through a main scavenge line to the main section of the oil tank by a main lube pump;
draining another portion of the excess lubricant from the sump in the lubricant transfer unit through an auxiliary scavenge line to an auxiliary section of the oil tank by the force of gravity; and
in response to determining that a pressure in the oil supply line is less than a predetermined pressure threshold:
drawing lubricant from the auxiliary section of the oil tank by the coaxial lube pump through an auxiliary feeding line to the planetary gearbox; and
circulating the lubricant from the auxiliary section of the oil tank through the planetary gearbox.

18. The method of claim 17, wherein the auxiliary feeding line includes a check valve.

19. The method of claim 18, further comprising supplying lubricant to prime the auxiliary feeding line through a priming line, wherein the priming line extends from an oil supply line port to an inlet port in the auxiliary feeding line downstream from the check valve of the auxiliary feeding line.

20. The method of claim 19, further comprising closing a pressure regulating valve that is positioned within the priming line when the pressure is less than the predetermined pressure threshold.

* * * * *